United States Patent [19]

Jeong

[11] Patent Number: 5,731,959
[45] Date of Patent: Mar. 24, 1998

[54] RESISTOR-PRINTED BOARD BUILT IN A FLYBACK TRANSFORMER FOR A VIDEO DISPLAY APPLIANCE

[75] Inventor: Seok Hwa Jeong, Kyoungsangbuk-Do, Rep. of Korea

[73] Assignee: LG Electronics Inc., Seoul, Rep. of Korea

[21] Appl. No.: 615,893

[22] Filed: Mar. 14, 1996

[51] Int. Cl.⁶ ............................................. H05K 1/16
[52] U.S. Cl. ..................... 361/765; 361/836; 361/761; 361/728; 361/736; 361/623; 336/65; 336/90; 315/441; 315/382; 315/382.1; 315/383
[58] Field of Search ......................... 361/765, 760, 361/331, 399; 336/65, 90; 315/411, 382, 382.1, 383

[56] References Cited

U.S. PATENT DOCUMENTS

| | | |
|---|---|---|
| 3,886,434 | 5/1975 | Schreiner ............................ 363/68 |
| 4,195,278 | 3/1980 | Doyle et al. . |
| 4,499,522 | 2/1985 | Nakamura . |
| 5,160,872 | 11/1992 | Kenji et al. ............................ 315/411 |
| 5,274,351 | 12/1993 | Lee . |
| 5,459,378 | 10/1995 | Kato et al. ............................ 315/382.1 |

FOREIGN PATENT DOCUMENTS 0475079  3/1992  European Pat. Off. .

*Primary Examiner*—Gerald P. Tolin
*Assistant Examiner*—David Foster
*Attorney, Agent, or Firm*—Oppenheimer Poms Smith

[57] ABSTRACT

A resistor-printed board built in a flyback transformer for a video display appliance with a reduced size as well as the resistance error of the printed resistors. A focus volume and a screen volume are printed on one surface of the resistor-printed board, and a bleeder resistor is printed on the other surface thereof, so that the size of the resistor-printed board is reduced, and a focus voltage and a screen voltage to be supplied to the appliance are stably adjusted, not affected by the printed error of the bleeder resistor.

6 Claims, 3 Drawing Sheets

RESISTOR-PRINTED BOARD BUILT IN A FLYBACK TRANSFORMER FOR A VIDEO DISPLAY APPLIANCE

BACKGROUND OF THE INVENTION

1. Field of the Invention

The present invention relates generally to a flyback transformer for supplying a high voltage to a cathode-ray tube for video display appliances such as a color television receiver, a monitor, etc. In particular, the present invention relates to a resistor-printed board built in a flyback transformer which can reduce the size and the resistance error of the resistor-printed board.

2. Description of the Prior Art

A flyback transformer is provided in a video display appliance to generate and supply a high voltage to a cathode-ray tube (CRT). In the flyback transformer, resistors and variable resistors for controlling the operation of the CRT are installed.

FIGS. 1 to 3 are views showing a conventional resistor-printed board built in a flyback transformer and the circuit constructed thereby. Referring to FIGS. 1 to 3, a bleeder resistor 2, a focus volume (i.e., variable resistor) 3, and a screen volume 4 are printed in series on a board 1. The variable terminal 5 of the focus volume 3 and that 6 of the screen volume 4 are connected to respective contacts (not illustrated) which are mounted on a focus shaft 8 and a screen shaft 9, respectively, so that the resistance values of the focus volume 3 and the screen volume 4 are varied by rotating the focus shaft 8 and the screen shaft 9, respectively. One terminal of the bleeder resistor 2 and that of the screen volume 4 are coupled to a secondary winding of the flyback transformer 7.

However, the conventional resistor-printed board as described above has the drawback in that since the bleeder resistor 2, focus volume 3, and screen volume 4 are printed in series on the board 1, the entire length of the board 1 is increased, and thus the size of a board cover 10 is increased, causing the entire size of the flyback transformer 7 also to be increased.

Further, since the bleeder resistor 2, which has the resistance value of several hundred MΩ, the focus volume 3, and the screen volume 4 are formed in a body, the total amount of the resistance error caused thereby is aggravated, resulting in the focus voltage and the screen voltage to be supplied to the CRT becoming unstable.

Meanwhile, FIGS. 4 to 6 are views showing another conventional resistor-printed board built in a flyback transformer. Referring to FIGS. 4 to 6, a bleeder resistor 12 is printed on an upper board 11, and a focus volume 14 and a screen volume 15 are printed in series on a lower board 13. One terminal 16 of the bleeder resistor 12 and that 17 of the focus volume 14 are commonly connected to a center tap of the secondary winding 19 of the flyback transformer 18 as shown in FIG. 6.

The numeral 20 denotes the other terminal of the bleeder resistor, 21 denotes the variable terminal of the focus volume, 22 denotes the variable terminal of the screen volume, 23 denotes a focus shaft, 24 denotes a screen shaft, and 25 denotes a board cover.

According to the conventional resistor-printed boards as constructed above, one terminal 16 of the bleeder resistor 12 which is printed on the upper board 11 is connected to the center tap of the secondary winding 19 of the flyback transformer 18, while the other terminal 20 thereof is connected to the cathode of a high voltage diode provided in the flyback transformer 18. The bleeder resistor 12 performs a voltage drop in the secondary winding 19 of the flyback transformer 18. In practice, a high voltage of about 20 KV induced in the secondary winding 19 of the flyback transformer 18 is dropped to a voltage in the range of 6 to 7 KV by the bleeder resistor 12.

Specifically, the voltage drop through the bleeder resistor 12 is about 14 to 13 KV. This voltage drop enables the adjustment of the focus volume 14 and the screen volume 15 to be performed within the greatly lowered voltage range of about 6 to 7 KV, resulting in the focus voltage and the screen voltage to be supplied to the CRT becoming substantially stable.

Since the bleeder resistor 12 for the voltage drop is separately printed on the upper board 11, its printing position can be freely determined. Also, since one terminal 16 of the bleeder resistor 16 is connected to the center tap of the secondary winding 19 of the flyback transformer 18, and since one terminal 17 of the focus volume 14, which is-connected to the screen volume 15, is connected to the center tap of the secondary winding 19 of the flyback transformer 18, the voltage applied through the focus volume 14 and the screen volume 15 becomes about 6 to 7 KV. Accordingly, the focus voltage and the screen voltage to be supplied to the CRT are not affected by the printing error of the bleeder resistor 12, but affected only by the resistance error of the focus volume 14 and the screen volume 15. Further, since the bleeder resistor 12 for performing the voltage drop, and the focus and screen volume 14 and 15 are separately formed on the upper and lower board 11 and 13, only the lower board 13 provided with the focus and screen volumes 14 and 15 may be selectively used in a television set which requires no voltage drop.

According to the conventional resistor-printed boards as described above, however, the upper board 11 on which the bleeder resistor 12 is printed, and the lower board 13 on which the focus volume 14 and the screen volume 15 are printed are separately installed in the flyback transformer 18, and this causes the structure and the manufacturing process of the flyback transformer to be complicated. Further, in case that such resistor-printed boards are used in a television set which requires no voltage drop, the upper board 11 on which the bleeder resistor 12 is printed should be separated and removed from the flyback transformer 18, causing inconvenience to a manufacturer.

SUMMARY OF THE INVENTION

It is an object of the present invention to solve the above problems involved in the prior art, in particular to provide a resistor-printed board in a flyback transformer for a video display appliance which can reduce the size of the board built in the flyback transformer, thereby reducing the entire size of the flyback transformer.

It is another object of the present invention to provide a resistor-printed board built in a flyback transformer for a video display appliance by which a focus voltage and a screen voltage to be supplied to the CRT can be stably adjusted, not affecting by the printing error of the bleeder resistor.

In order to achieve the above objects, there is provided a resistor-printed board built in a flyback transformer for a cathode ray tube on which a bleeder resistor, a focus volume, and a screen volume are printed, characterized in that the focus volume and the screen volume are printed on one surface of the board, and the bleeder resistor is printed on the other surface of the board.

BRIEF DESCRIPTION OF THE DRAWINGS

The above objects, other features and advantages of the present invention will become more apparent by describing a preferred embodiment thereof with reference to the accompanying drawing, in which.

DETAILED DESCRIPTION OF THE PREFERRED EMBODIMENT

Figure 1:
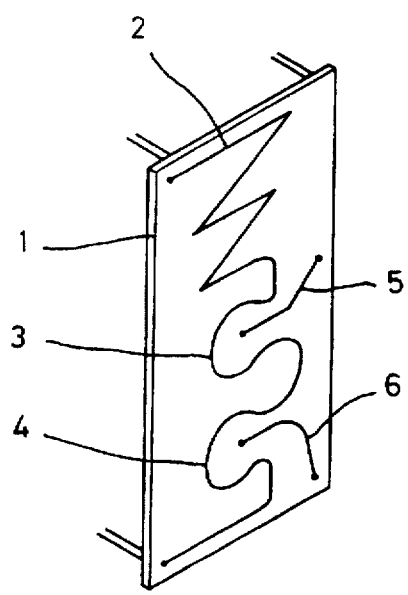
FIG. 1 is a perspective view of a conventional resistor-printed board.
Figure 2:
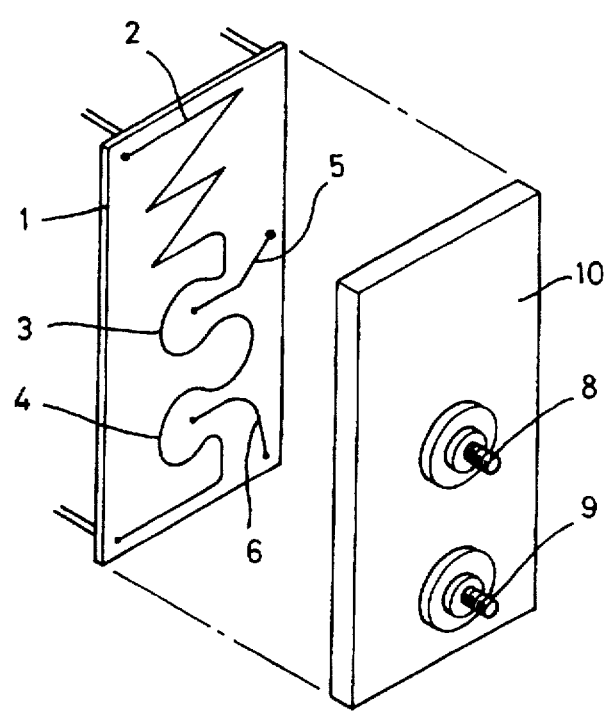
FIG. 2 is an exploded perspective view showing the resistor-printed board of FIG. 1 in an assembled state.
Figure 3:
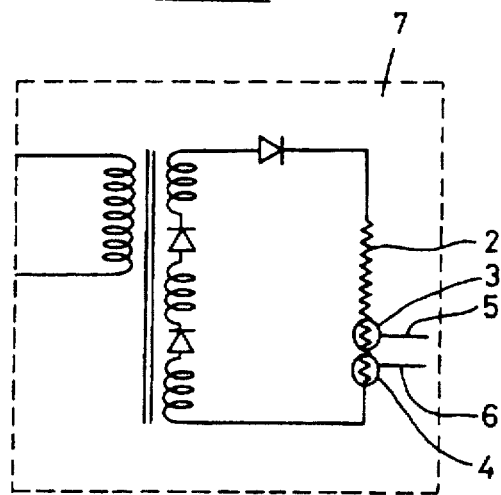
FIG. 3 is a schematic circuit diagram showing the construction in that the resistor-printed board of FIG. 1 is coupled to a flyback transformer.
Figure 4:
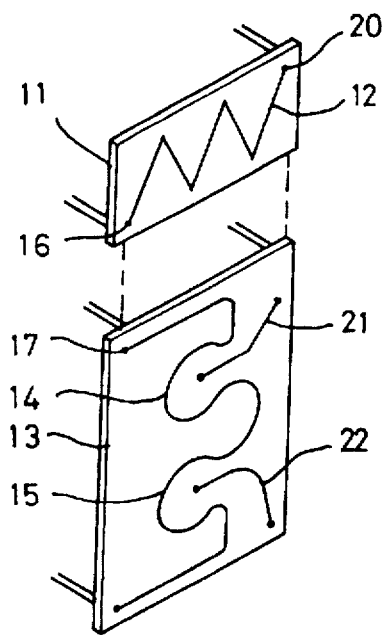
FIG. 4 is a perspective view of another conventional resistor-printed board of FIG. 4 in an assembled state.
Figure 5:
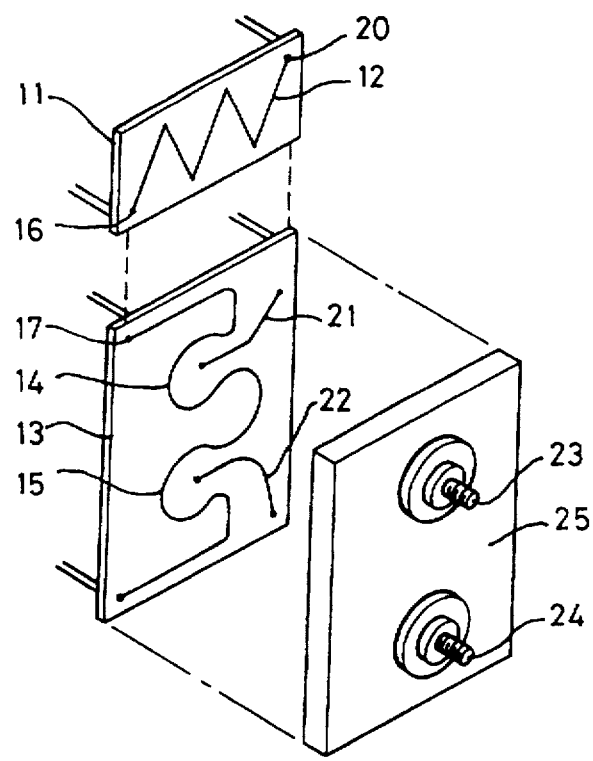
FIG. 5 is an exploded perspective view showing the resistor-printed board of FIG. 4 in an assembled state.
Figure 6:
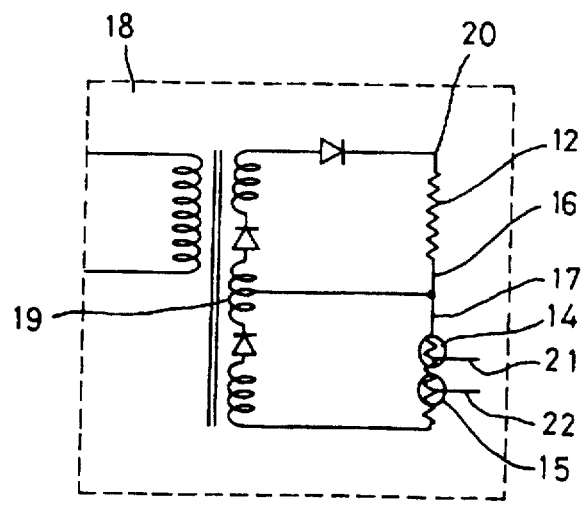
FIG. 6 is a schematic circuit diagram showing the construction in that the resistor-printed board of FIG. 4 is coupled to a flyback transformer.
Figure 7:
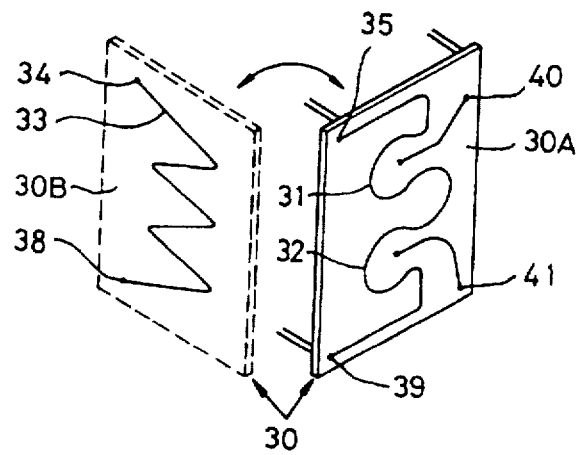
FIG. 7 is a perspective view of the resistor-printed board according to the present invention.
Figure 8:
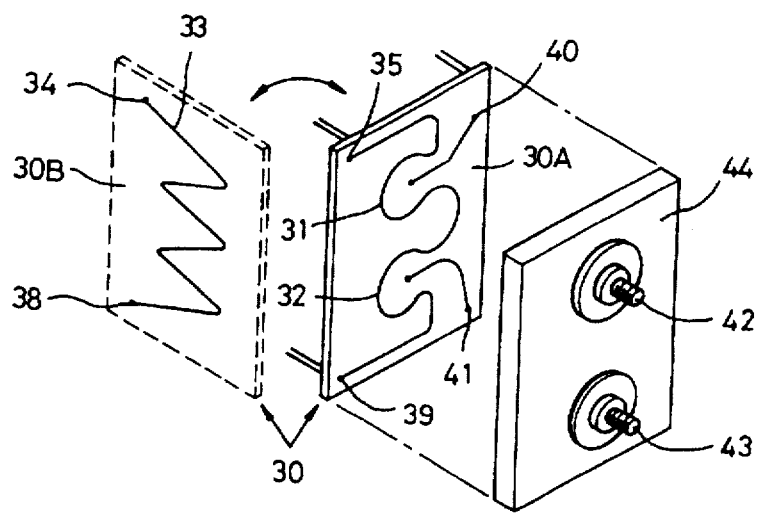
FIG. 8 is an exploded perspective view showing the resistor-printed board of FIG. 7 in an assembled state.
Figure 9:
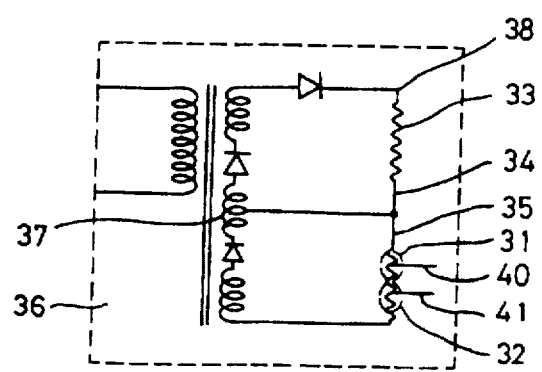
FIG. 9 is a schematic circuit diagram showing the construction in that the resistor-printed board of FIG. 7 is coupled to a flyback transformer.

FIGS. 7 and 8 are perspective views showing the resistor-printed board according to the present invention, and the resistor-printed board in an assembled state, respectively. FIG. 9 is a schematic circuit diagram showing the construction in that the resistor-printed board according to the present invention is coupled to the flyback transformer.

Referring to FIGS. 7 to 9, on one surface 30A of the resistor-printed board 30, the focus volume 31 and the screen volume 32 are printed, while on the other surface 30B of the resistor-printed board 30, the bleeder resistor 33 is printed. One terminal 34 of the bleeder resistor 33 and one terminal 35 of the focus volume 31 are connected to the center tap of the secondary winding 37 of the flyback transformer 36, and the other terminal 38 of the bleeder resistor 33 is connected to the cathode of a high voltage diode provided in the flyback transformer 36.

The numeral 39 denotes one terminal of the screen volume, 40 and 41 denotes variable terminals of the focus volume and the screen volume, respectively, 42 and 43 denote shafts of the focus volume and the screen volume, respectively, and 44 denotes a board cover.

The features of the resistor-printed board according to the present invention having the above-described structure will now be explained.

Referring to FIGS. 7 and 8, the bleeder resistor 33 is printed on the rear surface 30B of the resistor-printed board 30, and the focus volume 31 and the screen volume 32 are printed on the front surface 30A of the resistor-printed board 30. The resistor-printed board 30 is then fixed to the board cover 44 by molding.

Thereafter, one terminal 34 of the bleeder resistor 33 is connected to the center tap of the secondary winding 37 of the flyback transformer 36, and the other terminal 38 thereof is connected to the cathode of the high voltage diode provided in the flyback transformer 38. One terminal 35 of the focus volume 31 is also connected to the center tap of the secondary winding 37 of the flyback transformer 36.

The bleeder resistor 33 performs a voltage drop in the secondary winding 37 of the flyback transformer 36. At this time, by a user's manual adjustment of the focus volume shaft 42 and the screen volume shaft 43, the focus voltage and the screen voltage to be supplied to the CRT are stably adjusted through the focus volume 31 and the screen volume 32, respectively.

From the foregoing, it will be apparent that the resistor-printed board according to the present invention provides the advantages that it can reduce its own size and thereby minimize the entire size of the flyback transformer by printing the bleeder resistor on one surface thereof and printing the focus and the screen volumes on the other surface thereof.

While the present invention has been described and illustrated herein with reference to the preferred embodiment thereof, it will be understood by those skilled in the art that various changes in form and details may be made therein without departing from the spirit and scope of the invention.

What is claimed is:

1. A resistor-printed board built in a flyback transformer including a primary winding, a secondary winding and a center tap therebetween for a video display appliance, the board comprising:

a first surface;

a second surface;

a focus volume resistor and a screen volume resistor printed on said first surface of the board, and a bleeder resistor printed on said second surface of the board;

said focus volume resistor being electrically connected to the center tap; and said bleeder resistor being electrically connected to said focus volume resistor and the center tap.

2. A resistor-printed board built in a transformer including a primary winding, a secondary winding, and a center tap of the secondary winding for a video display appliance, the board comprising:

a first surface and a second surface;

a focus volume variable resistor, with a fixed terminal and a variable terminal, printed on said first surface of the resistor-printed board, said fixed terminal being connected to the center tap of the secondary winding;

a screen volume variable resistor, with a fixed terminal and a variable terminal printed on said first surface of the resistor-printed board; and a bleeder-resistor printed on said second surface of the resistor-printed board with a first terminal and a second terminal, said first terminal being connected to said fixed terminal of said focus volume variable resistor and to the center tap of the secondary winding.

3. An assembly as defined in claim 2 further comprising a cover with a first shaft for said focus volume variable resistor and a second shaft for said screen volume variable resistor.

4. A resistor-printed board built in a flyback transformer including a primary winding, a secondary winding, and a center tap of the secondary winding for a video display application comprising:

a first surface and a second surface;

a focus volume resistor printed on said first surface electrically connected to the center tap of the secondary winding;

a screen volume resistor printed on said first surface; and a bleeder-resistor printed on said second surface electrically connected to said focus volume resistor and to the center tap of the secondary winding.

5. An assembly as defined in claim 4 further comprising:

a focus shaft connected to said focus volume resistor; and a screen shaft connect to said screen volume resistor.

6. An electrical circuit for a video display application comprising:

a resistor-printed board including:

a first surface and a second surface;

a focus volume resistor printed on said first surface;

a screen volume resistor printed on said first surface; and a bleeder-resistor printed on said second surface electrically connected to said focus volume, said bleeder-resistor including a first terminal and a second terminal; and a flyback transformer including:

a primary coil;

a secondary coil;

a center tap between said primary and said secondary coils; and a diode connected to said secondary coil;

said first terminal of said bleeder resistor being connected to said center tap; and said second terminal of said bleeder resistor being connected to said diode.

* * * * *